United States Patent
Nagata et al.

(10) Patent No.: US 8,659,560 B2
(45) Date of Patent: Feb. 25, 2014

(54) INPUT DEVICE AND DISPLAY APPARATUS INCLUDING THE SAME

(75) Inventors: Yasunari Nagata, Higashiomi (JP);
Takashi Shimizu, Kirishima (JP);
Natsuko Yamagata, Kirishima (JP);
Akinori Satou, Kirishima (JP); Takashi Minami, Kirishima (JP); Yoshio Miyazaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 820 days.

(21) Appl. No.: 12/892,600

(22) Filed: Sep. 28, 2010

(65) Prior Publication Data
US 2011/0074730 A1     Mar. 31, 2011

(30) Foreign Application Priority Data
Sep. 29, 2009  (JP) ................................. 2009-223745
Aug. 30, 2010  (JP) ................................. 2010-191957

(51) Int. Cl.
*G06F 3/041* (2006.01)

(52) U.S. Cl.
USPC ........................ 345/173; 178/18.01; 345/156

(58) Field of Classification Search
USPC ......................................... 345/156, 173–181
See application file for complete search history.

(56) References Cited

U.S. PATENT DOCUMENTS

| | | | |
|---|---|---|---|
| 7,737,637 B2* | 6/2010 | Koshihara et al. | 313/512 |
| 8,217,902 B2* | 7/2012 | Chang et al. | 345/173 |
| 2008/0100592 A1 | 5/2008 | Shigeno et al. | |

FOREIGN PATENT DOCUMENTS

JP      2008-97283 A    4/2008

* cited by examiner

*Primary Examiner* — Duc Dinh
(74) *Attorney, Agent, or Firm* — Birch, Stewart, Kolasch & Birch, LLP

(57) ABSTRACT

An input device includes a substrate including a first principal surface and a second principal surface opposite the first principal surface; a plurality of first detecting electrodes disposed on the second principal surface of the substrate; a plurality of second detecting electrodes disposed on the second principal surface of the substrate; at least one first connecting electrode disposed on the second principal surface of the substrate, the first connecting electrode being configured to connect adjacent first detecting electrodes to each other; at least one second connecting electrode including an intersection that is spaced from the second principal surface of the substrate and crosses the first connecting electrode, the second connecting electrode being configured to connect adjacent second detecting electrodes to each other; and a light diffusing member disposed at least in an area corresponding to the intersection.

8 Claims, 12 Drawing Sheets

| HAZE VALUE (%) | APPEARANCE OF INTERSECTION | VISIBILITY OF IMAGE |
|---|---|---|
| 0.0 | POOR | GOOD |
| 0.1 | POOR | GOOD |
| 0.2 | POOR | GOOD |
| 0.3 | FAIR | GOOD |
| 0.4 | FAIR | GOOD |
| 0.5 | GOOD | GOOD |
| 0.6 | GOOD | GOOD |
| 0.8 | GOOD | GOOD |
| 1.0 | GOOD | GOOD |
| 1.5 | GOOD | GOOD |
| 2.0 | GOOD | GOOD |
| 2.5 | GOOD | FAIR |
| 3.0 | GOOD | FAIR |
| 3.5 | GOOD | FAIR |
| 4.0 | GOOD | FAIR |
| 4.5 | GOOD | FAIR |
| 5.0 | GOOD | FAIR |
| 6.0 | GOOD | POOR |
| 7.0 | GOOD | POOR |
| 8.0 | GOOD | POOR |
| 9.0 | GOOD | POOR |
| 10.0 | GOOD | POOR |

INPUT DEVICE AND DISPLAY APPARATUS INCLUDING THE SAME

BACKGROUND OF THE INVENTION

1. Field of the Invention

The present invention relates to, for example, an input device that detects a location where the user has performed an input operation as an input position, and a display apparatus that includes the input device.

2. Description of the Related Art

An example of the input device is a capacitive touch panel that detects an input position on the basis of a change in capacitance between a finger and a detecting electrode (see, e.g., Japanese Unexamined Patent Application Publication No. 2008-97283).

Such an input device includes a substrate, a plurality of first detecting electrodes arranged on the substrate at predetermined intervals in a first direction, a plurality of second detecting electrodes arranged on the substrate at predetermined intervals in a second direction, at least one first connecting electrode configured to connect adjacent first detecting electrodes to each other, and at least one second connecting electrode configured to connect adjacent second detecting electrodes to each other. In this input device, to electrically isolate the first connecting electrode from the second connecting electrode, an insulator is provided at an intersection between the first connecting electrode and the second connecting electrode. Specifically, the insulator is formed such that it covers the first connecting electrode, and the second connecting electrode is formed on the insulator. Thus, at the intersection between the first connecting electrode and the second connecting electrode, the first connecting electrode is electrically isolated from the second connecting electrode.

However, in the input device described above, since the insulator is disposed at the intersection between the first connecting electrode and the second connecting electrode, the intersection and other portions differ in height. As a result, if the input device described above is included in a display apparatus, the intersection of the input device may be seen by the user.

SUMMARY OF THE INVENTION

The present invention has been made in view of the problem described above. An object of the present invention relates to an input device that can provide improved visibility and a display apparatus that includes the input device.

An input device according to an aspect of the present invention includes a substrate including a first principal surface and a second principal surface opposite the first principal surface; a plurality of first detecting electrodes disposed on the second principal surface of the substrate; a plurality of second detecting electrodes disposed on the second principal surface of the substrate; at least one first connecting electrode disposed on the second principal surface of the substrate, the first connecting electrode being configured to connect adjacent first detecting electrodes to each other; at least one second connecting electrode including an intersection that is spaced from the second principal surface of the substrate and crosses the first connecting electrode, the second connecting electrode being configured to connect adjacent second detecting electrodes to each other; and a light diffusing member disposed at least in an area corresponding to the intersection.

DESCRIPTION OF THE PREFERRED EMBODIMENTS

Embodiments of the present invention will now be described with reference to the drawings.

Figure 1:
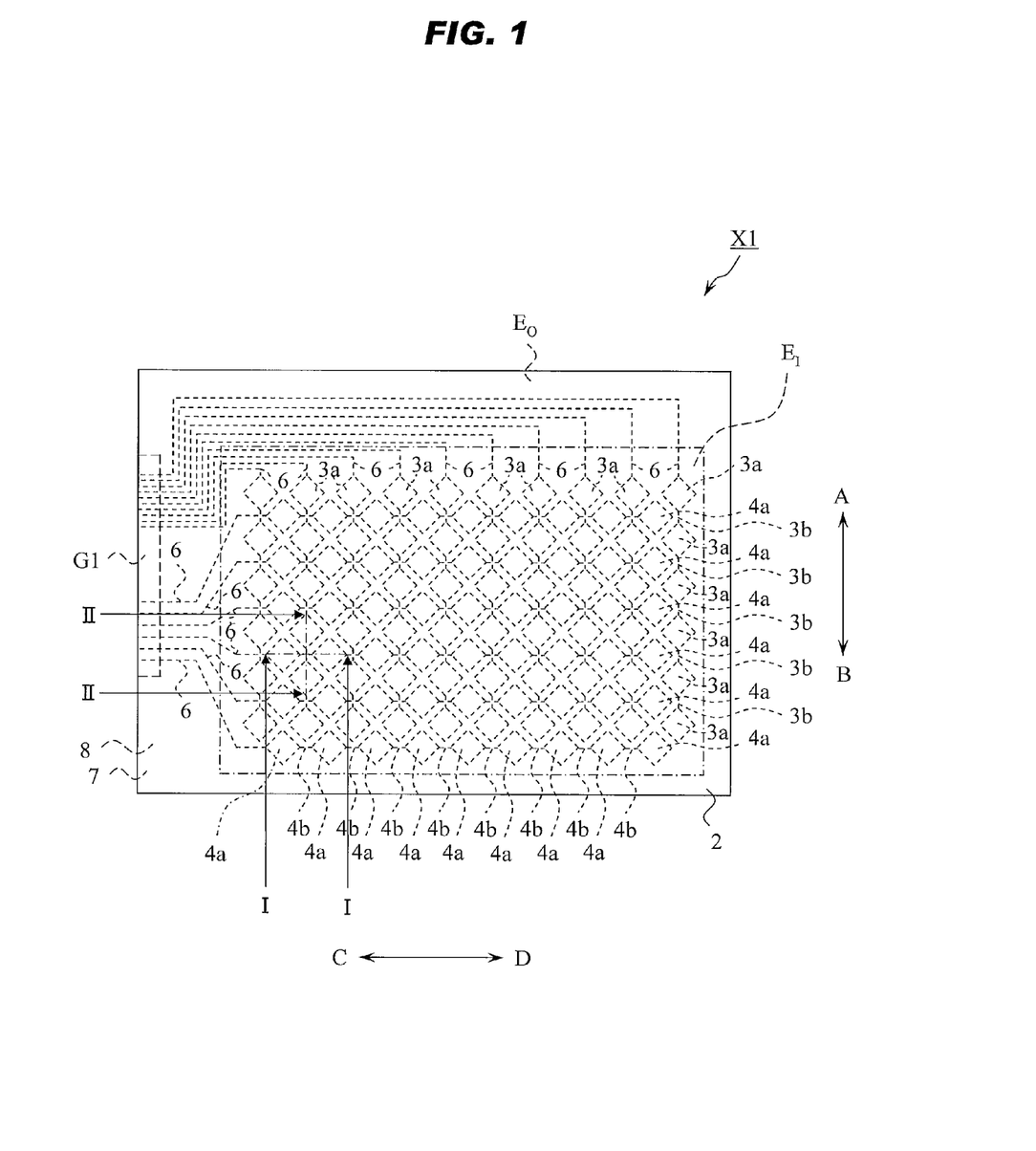
FIG. 1 is a plan view illustrating a general configuration of an input device according to an embodiment of the present invention.
Figure 2:
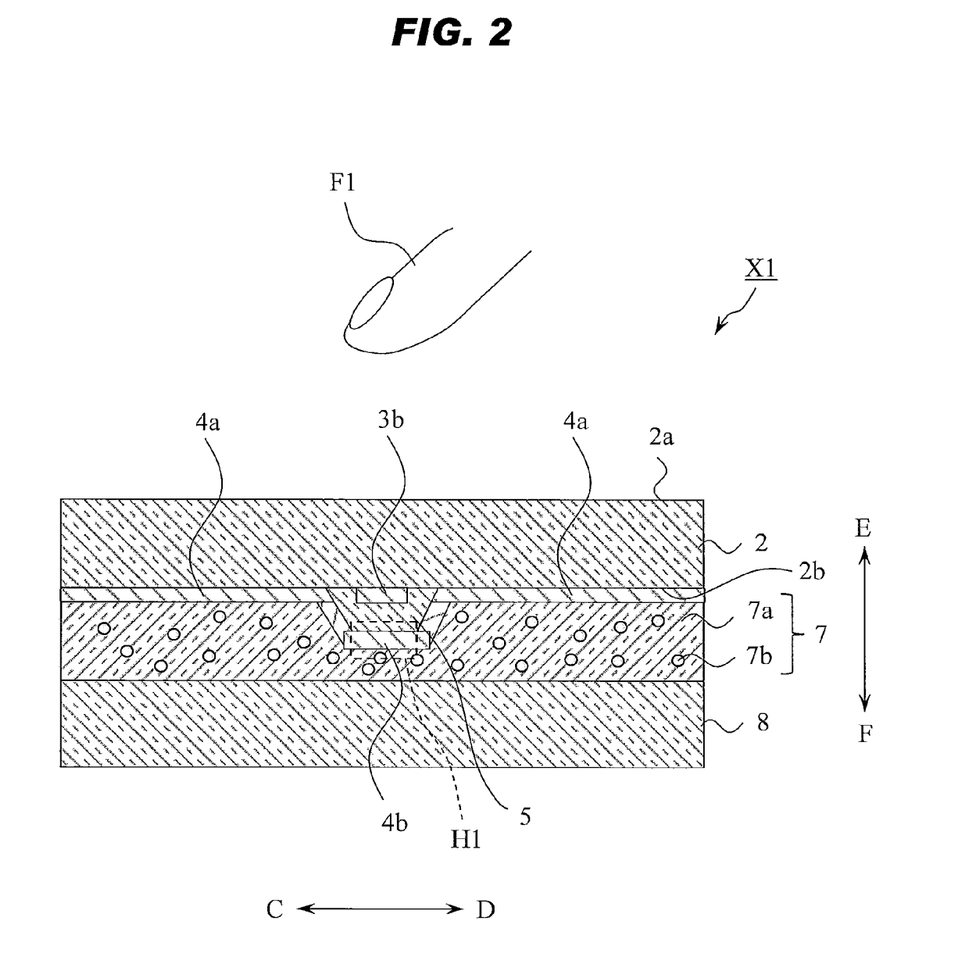
FIG. 2 is a cross-sectional view taken along line II-II of FIG. 1.
Figure 3:
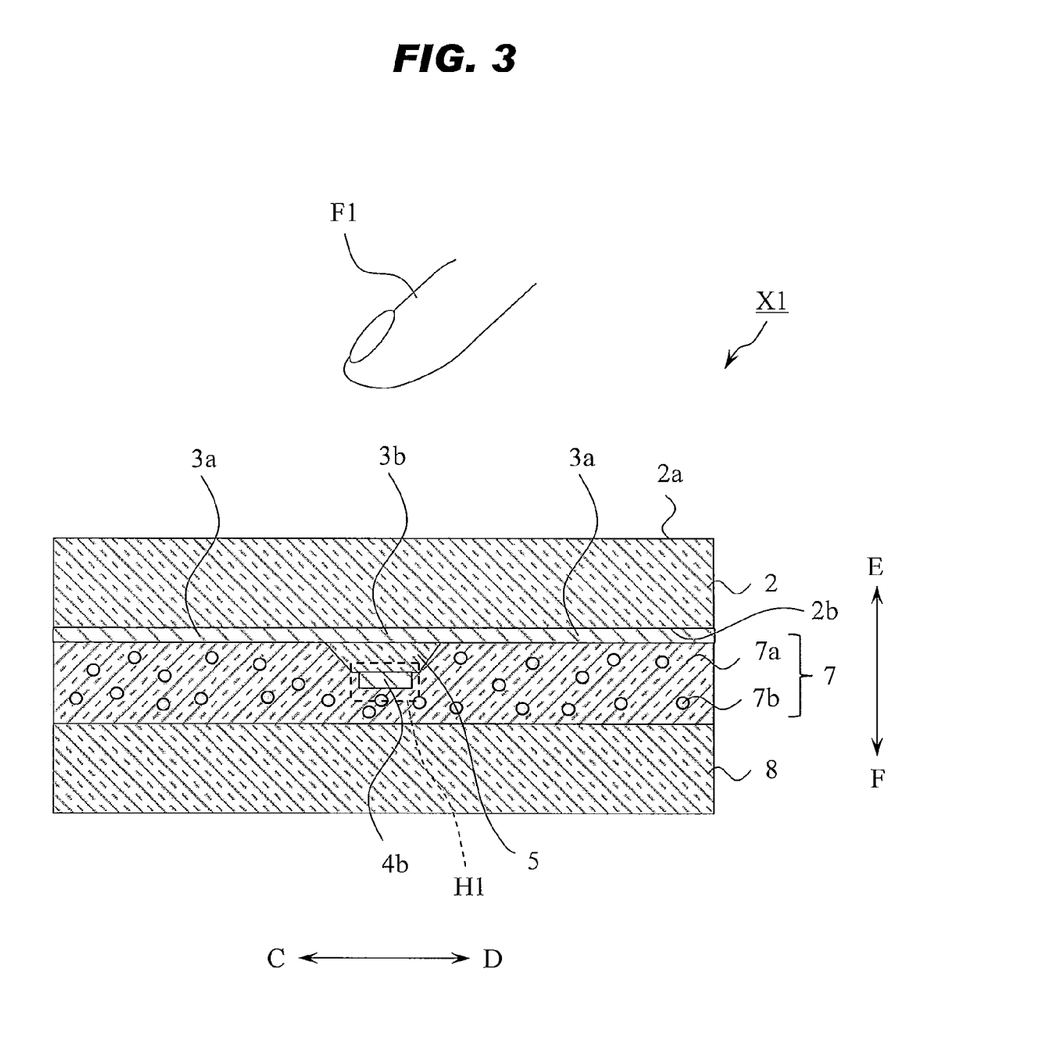
FIG. 3 is a cross-sectional view taken along line III-III of FIG. 1.

As illustrated in FIG. 1 to FIG. 3, an input device X1 of the present embodiment is a capacitive touch panel that includes a substrate 2 having translucency.

As illustrated in FIG. 1, the input device X1 has an input region $E_I$ and an outside region $E_O$ located outside the input region $E_I$. The user can input information by moving a finger F1 (see FIG. 2 and FIG. 3) closer to the input region $E_I$ or by touching or pressing the input region $E_I$ with the finger F1. The outside region $E_O$ includes an external conduction area G1 electrically connected, for example, to a flexible printed circuit (FPC) (outside the drawing).

In the input region $E_I$, the substrate 2 supports first detecting electrodes 3a, first connecting electrodes 3b, second detecting electrodes 4a, and second connecting electrodes 4b (described below). At the same time, the substrate 2 supports wiring conductors 6 (described below) in the outside region $E_O$. The substrate 2 has a first principal surface 2a and a second principal surface 2b opposite the first principal surface 2a. A portion of the first principal surface 2a of the substrate 2, the portion corresponding to the input region $E_I$, is a surface which allows the user to input information by moving the finger F1 closer thereto, or by touching or pressing it with the finger F1. Therefore, the first principal surface 2a of the substrate 2 is preferably covered with a protective film (not shown). The substrate 2 is an insulating member capable of properly transmitting light therethrough in a direction crossing the principal surfaces 2a and 2b (i.e., in the direction of arrow EF). For example, the substrate 2 is made of material having translucency, such as transparent glass or transparent plastic. In particular, it is preferable that transparent glass be used, in terms of visibility and reliability. In the present specification, the term translucency refers to transmissive properties that allow visible light to pass through. The substrate 2 of the present embodiment is substantially rectangular in plan view, but the shape of the substrate 2 is not limited to this.

Referring to FIG. 2 and FIG. 3, the first detecting electrodes 3a, the first connecting electrode 3b, the second detecting electrodes 4a, the second connecting electrode 4b, and an insulator 5 are disposed in a portion of the second principal surface 2b of the substrate 2, the portion corresponding to the input region $E_I$.

The first detecting electrodes 3a detect an input position of the finger F1 near the input device X1 in a second direction (i.e., in the direction of arrow CD). Capacitance is formed between the finger F1 and the first detecting electrodes 3a. The first detecting electrodes 3a are arranged on the second principal surface 2b of the substrate 2 at predetermined intervals in a first direction (i.e., in the direction of arrow AB). For better detection sensitivity, the first detecting electrodes 3a of the present embodiment are substantially diamond-shaped in plan view. However, the shape of the first detecting electrodes 3a is not limited to this.

As illustrated in FIG. 3, the first connecting electrode 3b connects the adjacent first detecting electrodes 3a to each other. The first connecting electrode 3b is disposed on the second principal surface 2b of the substrate 2.

The second detecting electrodes 4a detect an input position of the finger F1 near the input device X1 in the first direction. Capacitance is formed between the finger F1 and the second detecting electrodes 4a. The second detecting electrodes 4a are arranged on the second principal surface 2b of the substrate 2 at predetermined intervals in the second direction. For better detection sensitivity, the second detecting electrodes 4a of the present embodiment are substantially diamond-shaped in plan view. However, the shape of the second detecting electrodes 4a is not limited to this.

As illustrated in FIG. 2, the second connecting electrode 4b connects the adjacent second detecting electrodes 4a to each other. The second connecting electrode 4b has an intersection H1 that is spaced from the second principal surface 2b of the substrate 2 and crosses the first connecting electrode 3b. The second connecting electrode 4b is disposed on the insulator 5 such that it is electrically isolated from the first connecting electrode 3b. The insulator 5 is disposed on the second principal surface 2b of the substrate 2 such that it covers the first connecting electrode 3b. This means that in the input device X1, the intersection H1 and other portions (e.g., the first detecting electrodes 3a and the second detecting electrodes 4a) differ in height. The insulator 5 is made of, for example, transparent resin, such as acrylic resin, epoxy resin, or silicon resin.

The first detecting electrodes 3a, the first connecting electrodes 3b, the second detecting electrodes 4a, and the second connecting electrodes 4b are made of, for example, conductive material having translucency, such as indium tin oxide (ITO), indium zinc oxide (IZO), antimony tin oxide (ATO), al-doped zinc oxide (AZO), tin oxide, zinc oxide, or conductive polymer (e.g., polyethylene dioxythiophene (PEDOT) or polystyrene sulfonate (PSS)).

Referring to FIG. 1, the wiring conductors 6 for applying voltage to the first detecting electrodes 3a and the second detecting electrodes 4a are disposed in a portion of the second principal surface 2b of the substrate 2, the portion corresponding to the outside region $E_o$.

The wiring conductors 6 are electrically connected to the first detecting electrodes 3a and the second detecting electrodes 4a at one end, and located in the external conduction area G1 at the other end. For higher hardness and shape stability, the wiring conductors 6 of the present embodiment are formed of a metal thin film. Examples of the metal thin film include an aluminum film, an aluminum alloy film, a laminated film composed of chromium and aluminum films, a laminated film composed of chromium and aluminum alloy films, a silver film, a silver alloy film, and a gold alloy film. Examples of a method for forming the metal thin film include sputtering, evaporation, and chemical-vapor deposition (CVD).

Referring to FIG. 2 and FIG. 3, on the second principal surface 2b of the substrate 2, a light diffusing member 7 is disposed at least in an area corresponding to the intersection H1. In the present embodiment, the light diffusing member 7 is disposed such that it covers the first detecting electrodes 3a, the first connecting electrode 3b, the second detecting electrodes 4a, the second connecting electrode 4b, the insulator 5, and the wiring conductors 6 (see FIG. 1).

The light diffusing member 7 is for diffusing light. The light diffusing member 7 includes an adhesive member 7a and a plurality of light diffusing particles 7b contained in the adhesive member 7a and having a refractive index different from that of the adhesive member 7a. The adhesive member 7a is, for example, an acrylic adhesive member, an epoxy adhesive member, or a silicon adhesive member. The light diffusing particles 7b are made of, for example, silicon dioxide, aluminum oxide, titanium oxide, yttrium oxide, zirconium dioxide, or hollow silicon dioxide. As described above, the light diffusing particles 7b have a refractive index different from that of the adhesive member 7a. However, to suppress backscattering, it is preferable that the refractive index of the light diffusing particles 7b be as close as possible to that of the adhesive member 7a.

Figure 4:
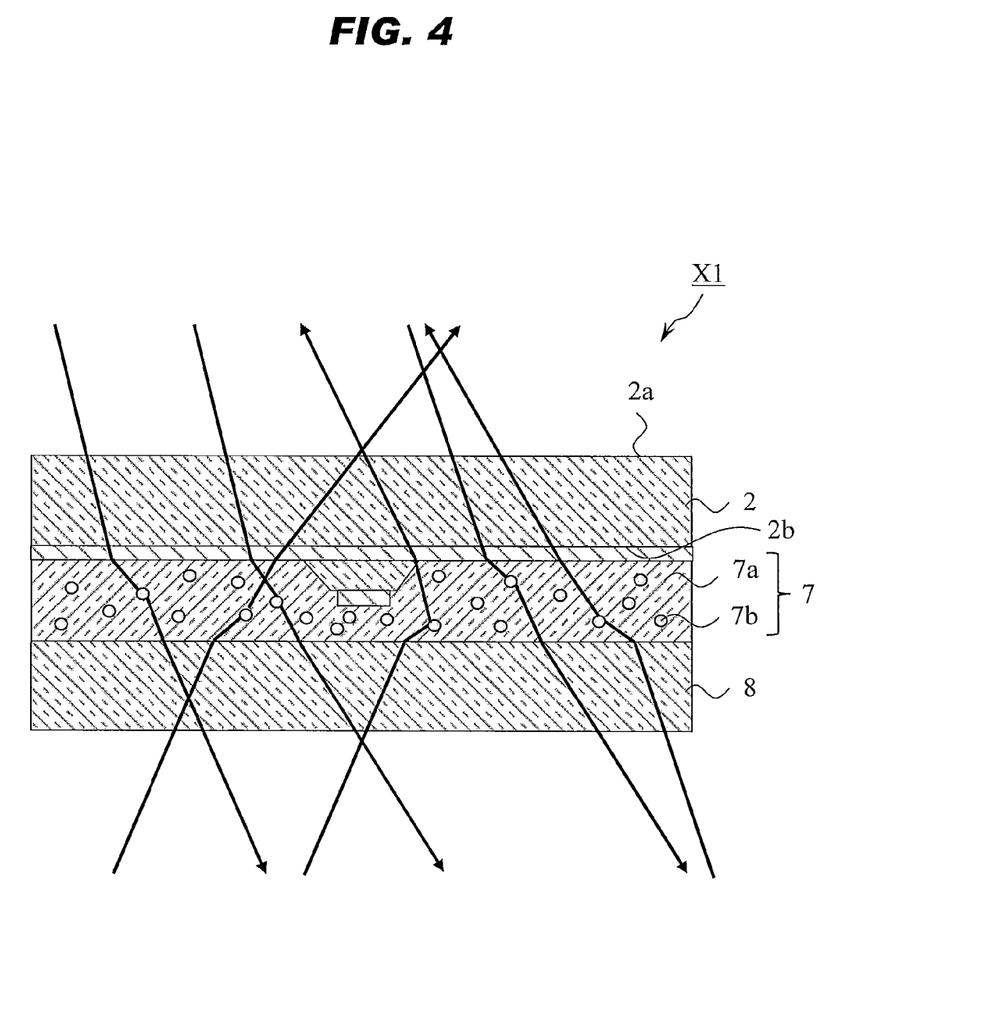
FIG. 4 illustrates diffusion of light through a light diffusing member.

FIG. 4 illustrates diffusion of light through the light diffusing member 7. Note that arrows in FIG. 4 are conceptual representations of light paths. As illustrated in FIG. 4, light (external light) coming from outside and light (internal light) coming from a backlight 51 (described below) when the input device X1 is used in a display apparatus Y1 (described below) are diffused or scattered by the light diffusing particles 7b. Therefore, in the input device X1, even if the intersection H1 differs in height from other portions, the intersection H1 is less likely to be seen by the user.

As described above, the light diffusing member 7 is capable of diffusing light. This light diffusing capability depends on optical properties of the light diffusing member 7. An example of physical property values representing optical properties of the light diffusing member 7 is a haze value. A haze value is expressed as the ratio of diffuse transmitted light to all transmitted light when the light diffusing member 7 is illuminated. This means that the higher the haze value, the higher the diffusing capability of the light diffusing member 7. When light is diffused by the light diffusing member 7, the intersection H1 is less likely to be seen by the user. However, if the haze value of the light diffusing member 7 is too high, an image blur may occur and low visibility may result. Therefore, to prevent such an image blur while reducing the possibility that the intersection H1 may be seen by the user, it is necessary to set the haze value of the light diffusing member 7 to an appropriate value.

Figure 5:
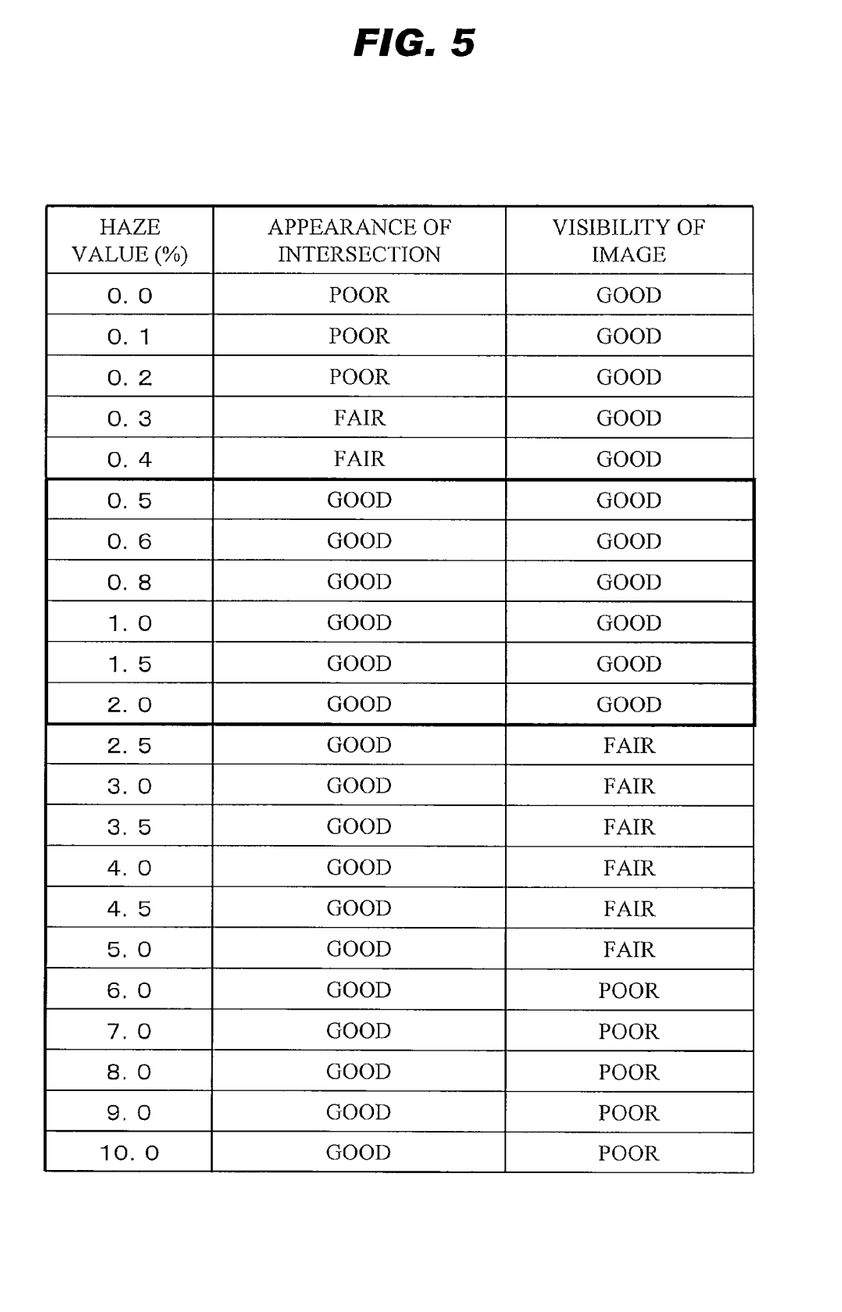
FIG. 5 is a table showing a result of a subject test in which the haze value of the light diffusing member was set to any value from 0% to 10%.

FIG. 5 is a table showing a result of a subject test in which the haze value of the light diffusing member 7 was set to any value from 0% to 10%. Specifically, the subject (or observer) first checked the appearance of the intersection H1. In the middle column of the table of FIG. 5, "good" indicates that the intersection H1 was not seen, "fair" indicates that the intersection H1 was slightly seen, and "poor" indicates that the intersection H1 was seen. Next, the subject checked the visibility of an image. In the right column of the table of FIG. 5, "good" indicates that the image was clearly displayed, "fair" indicates that the image was slightly blurred, and "poor" indicates that the image was blurred. FIG. 5 shows that when the haze value of the light diffusing member 7 was in the 0.5% to 2.0% range, the intersection H1 was not seen and the image was clearly displayed. Therefore, it is preferable that the haze value of the light diffusing member 7 be in the 0.5% to 2.0% range. If it is acceptable that the intersection H1 is slightly seen, the haze value of the light diffusing member 7 may be in the 0.3% to 0.5% range. If it is acceptable that the image is slightly blurred, the haze value of the light diffusing member 7 may be in the 2.0% to 5.0% range.

Referring to FIG. 2 and FIG. 3, a protecting member 8 is disposed under the light diffusing member 7.

The protecting member 8 is, for example, a polyethylene terephthalate (PET) film or a resin film. The protecting member 8 has a so-called anti-scattering function. For example, if the substrate 2 is broken, the protecting member 8 prevents the fragments of the substrate 2 from scattering. Without the protecting member 8, the light diffusing member 7 is exposed to air and the adhesive member 7a may absorb moisture. The moisture absorbed into the adhesive member 7a may reach the first detecting electrodes 3a, the first connecting electrode 3b, the second detecting electrodes 4a, and the second connecting electrode 4b and may cause them to corrode. When the protecting member 8 is disposed under the light diffusing member 7, moisture is less likely to be absorbed into the adhesive member 7a. Therefore, in the input device X1 of the present embodiment, it is less likely that the electrodes 3a, 3b, 4a, and 4b will corrode.

Next, a principle of detection performed by the input device X1 of the present embodiment will be described.

When the finger F1 (which is a conductor) moves closer to, or touches or presses a portion of the first principal surface 2a of the substrate 2, the portion corresponding to the input region $E_I$, the capacitance between the finger F1 and the detecting electrodes 3a and 4a changes. A driver (not shown) included in the input device X1 always detects changes in capacitance between the finger F1 and the detecting electrodes 3a and 4a. When the driver detects a capacitance change exceeding a predetermined value, the driver determines a position at which the capacitance change has been detected as an input position. Thus, the input device X1 can detect an input position. A method that the input device X1 uses to detect an input position may either be a mutual capacitance method or a self capacitance method. Using the mutual capacitance method is more preferable in that it allows a plurality of input positions to be detected at the same time.

Figure 6:
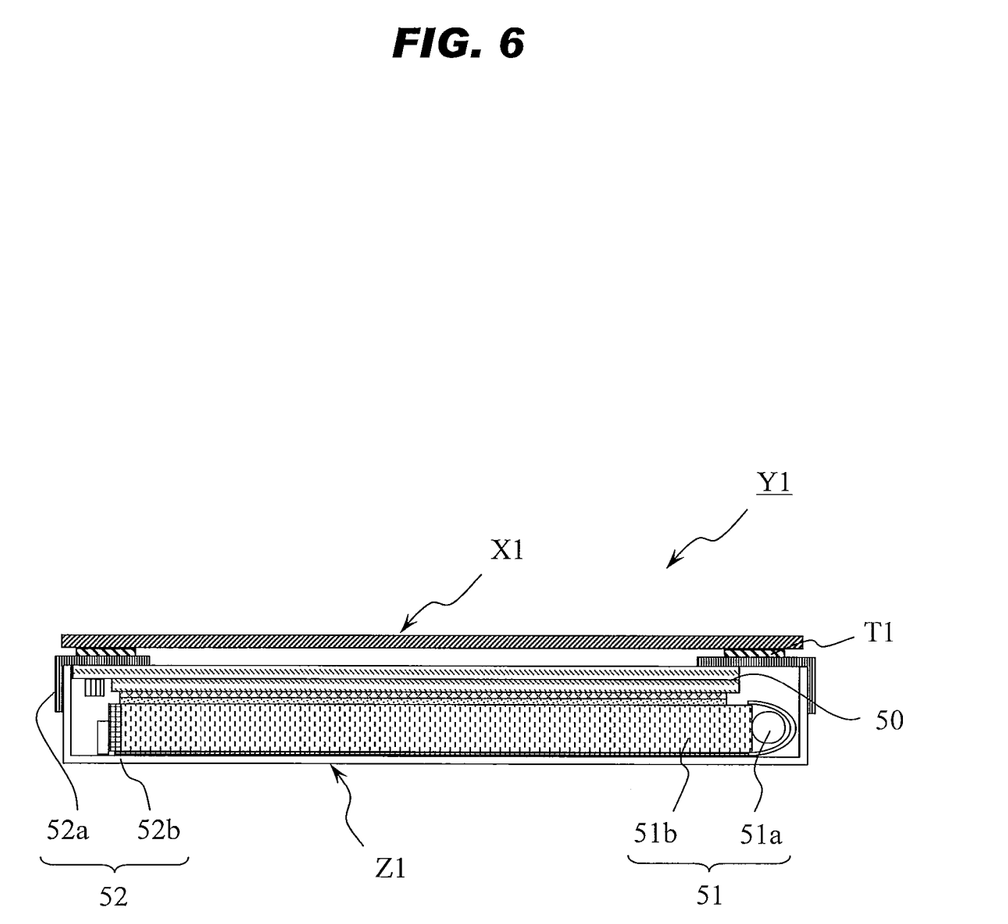
FIG. 6 is a cross-sectional view illustrating a display apparatus according to an embodiment of the present invention.

The input device X1 described above can be used, for example, in a display apparatus. FIG. 6 is a cross-sectional view illustrating an example of the display apparatus Y1 according to the present embodiment. As illustrated in FIG. 6, the display apparatus Y1 includes the input device X1 and a liquid-crystal display device Z1 disposed opposite the input device X1.

The liquid-crystal display device Z1 includes a liquid-crystal display panel 50, the backlight 51, and a housing 52.

The backlight 51 includes a light source 51a and a light guide plate 51b. The light source 51a emits light toward the light guide plate 51b. For example, the light source 51a is a light-emitting diode (LED). Instead of the LED, the light source 51a may be a cold cathode fluorescent lamp (CCFL), a halogen lamp, a xenon lamp, or electroluminescence (EL). The light guide plate 51b guides light from the light source 51a substantially uniformly throughout the undersurface of the liquid-crystal display panel 50.

The housing 52 contains the liquid-crystal display panel 50 and the backlight 51. The housing 52 has an upper housing 52a and a lower housing 52b. For example, the housing 52 is made of resin (e.g., polycarbonate) or metal (e.g., stainless (SUS) or aluminum).

The input device X1 and the liquid-crystal display device Z1 are bonded to each other, with a double-faced tape T1 therebetween. Specifically, the input device X1 and the liquid-crystal display device Z1 are bonded with the double-faced tape T1 such that the back surface of the protecting member 8 of the input device X1 faces a principal surface of the liquid-crystal display panel 50. A fixing member used to secure the input device X1 to the liquid-crystal display device Z1 is not limited to the double-faced tape T1. For example, the fixing member may be a bonding member made of thermoset resin or ultraviolet curable resin, or may be a fixing structure that structurally secures the input device X1 to the liquid-crystal display device Z1.

With the input device X1 described above, the user can input various types of information by pressing the input region $E_I$ of the input device X1 while looking at the liquid-crystal display panel 50 of the liquid-crystal display device Z1 through the input device X1. The input device X1 may have a function of transmitting a realistic feel of push-button switching operation to the user who is entering various types of information. To realize this function, the substrate 2 of the input device X1 has a piezoelectric element. Then, when a predetermined load associated with a pressing operation is detected, the input device X1 causes the piezoelectric element to vibrate at a predetermined frequency, and thereby causes the substrate 2 to vibrate in response to vibration of the piezoelectric element. A realistic feel of push-button switching operation can thus be transmitted to the user.

The display apparatus Y1 described above may be incorporated into various electronic appliances, such as mobile terminals including mobile phones and personal digital assistants (PDAs), electronic notebooks, personal computers, copiers, and gaming terminals.

As described above, the input device X1 and the display apparatus Y1 can provide improved visibility.

The foregoing embodiment of the present invention is merely an example and various modifications can be made. Some modifications will now be described.

First Modification

Figure 7:
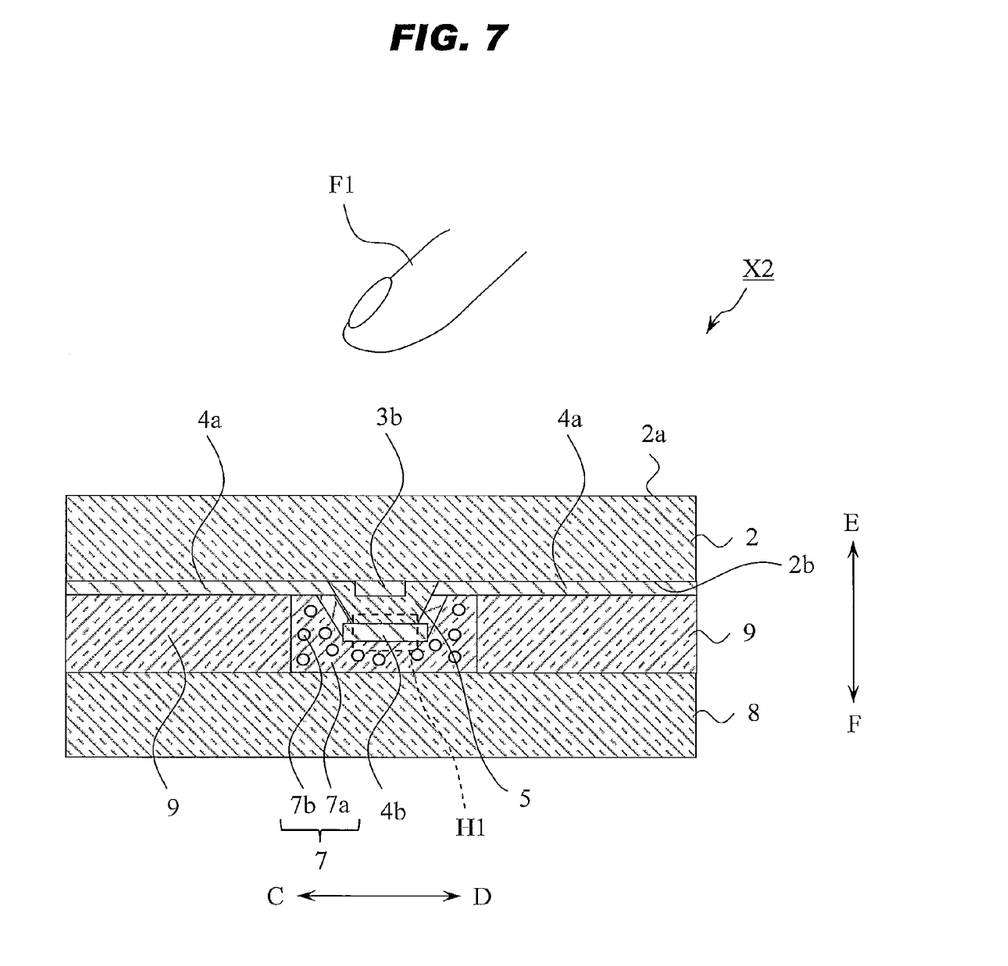
FIG. 7 is a cross-sectional view illustrating a general configuration of an input device according to a first modification. Note that FIG. 7 illustrates a cross section equivalent to that of FIG. 2.
Figure 8:
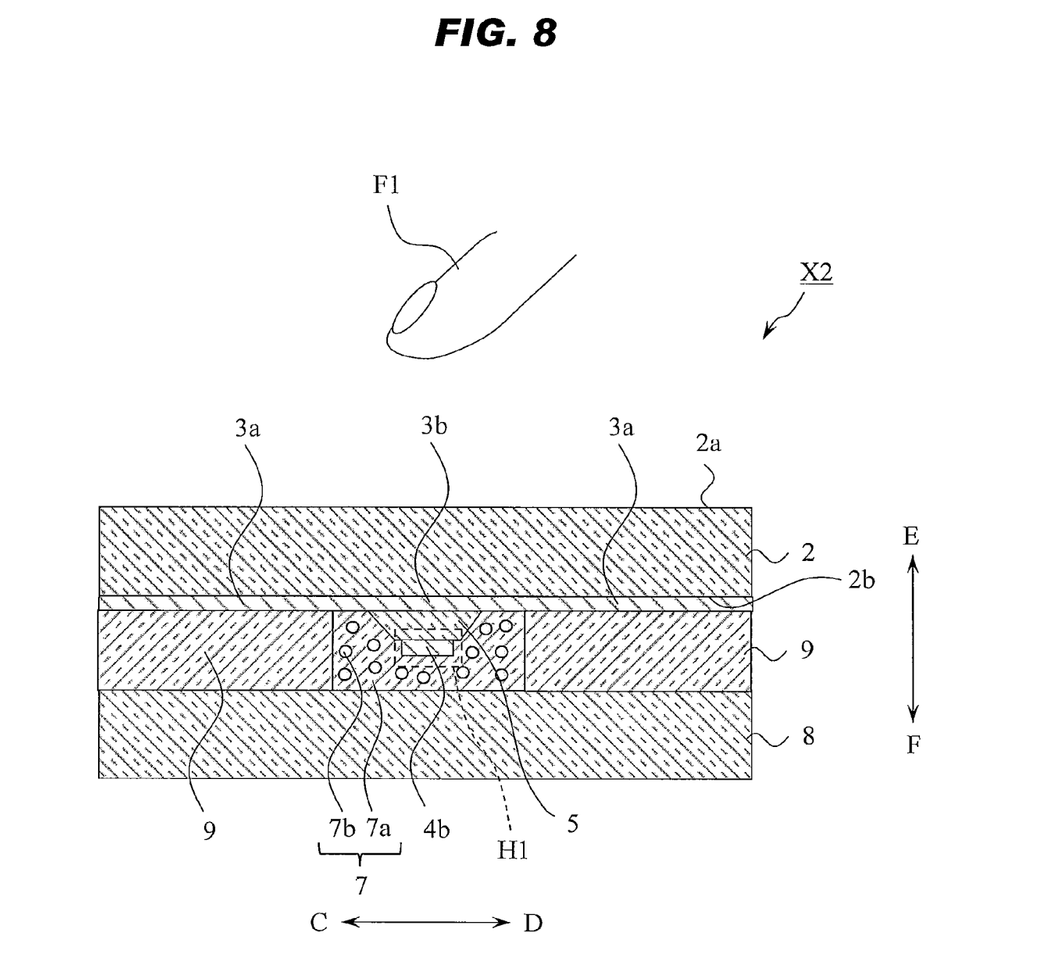
FIG. 8 is a cross-sectional view illustrating a general configuration of the input device according to the first modification. Note that FIG. 8 illustrates a cross section equivalent to that of FIG. 3.

FIG. 7 and FIG. 8 are cross-sectional views illustrating a general configuration of an input device X2 according to a first modification. FIG. 7 illustrates a cross section equivalent to that of FIG. 2, and FIG. 8 illustrates a cross section equivalent to that of FIG. 3. In FIG. 7 and FIG. 8, components having the same functions as those of the components illustrated in FIG. 2 and FIG. 3 are given the same reference numerals and their detailed description will be omitted.

As illustrated in FIG. 7 and FIG. 8, the input device X2 of the first modification includes the light diffusing member 7, as in the case of the input device X1. However, the input device X2 of the first modification is different from the input device X1 in that the light diffusing member 7 is disposed such that it covers the intersection H1 and the insulator 5, and in that the light diffusing member 7 is not provided in areas where the intersection H1 and the insulator 5 are not present. In the input device X2, in areas where the intersection H1 and the insulator 5 are not present, a joining member 9 is provided instead of the light diffusing member 7. The joining member 9 is made of, for example, transparent resin, such as acrylic resin, epoxy resin, or silicon resin.

Even when the light diffusing member 7 is disposed such that it covers the intersection H1 and the insulator 5 and the light diffusing member 7 is not provided in areas where the intersection H1 and the insulator 5 are not present, the same effects as those described in the above embodiment can be achieved. In the input device X2, in areas where the intersection H1 and the insulator 5 are not present, the joining member 9 is provided instead of the light diffusing member 7. Therefore, even if the haze value of the light diffusing member 7 is increased, it is possible to suppress an image blur. This means that in the input device X2, the appearance of the intersection H1 can be more effectively improved.

Second Modification

Figure 9:
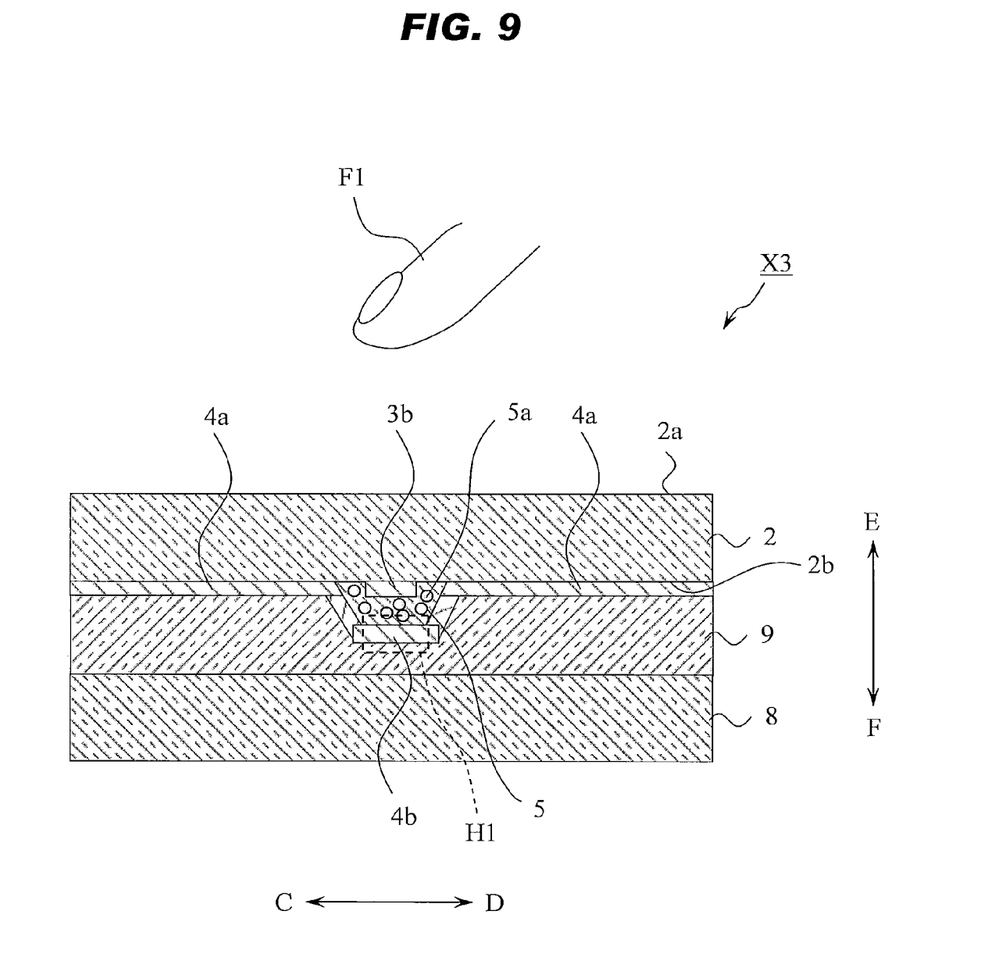
FIG. 9 is a cross-sectional view illustrating a general configuration of an input device according to a second modification. Note that FIG. 9 illustrates a cross section equivalent to that of FIG. 2.
Figure 10:
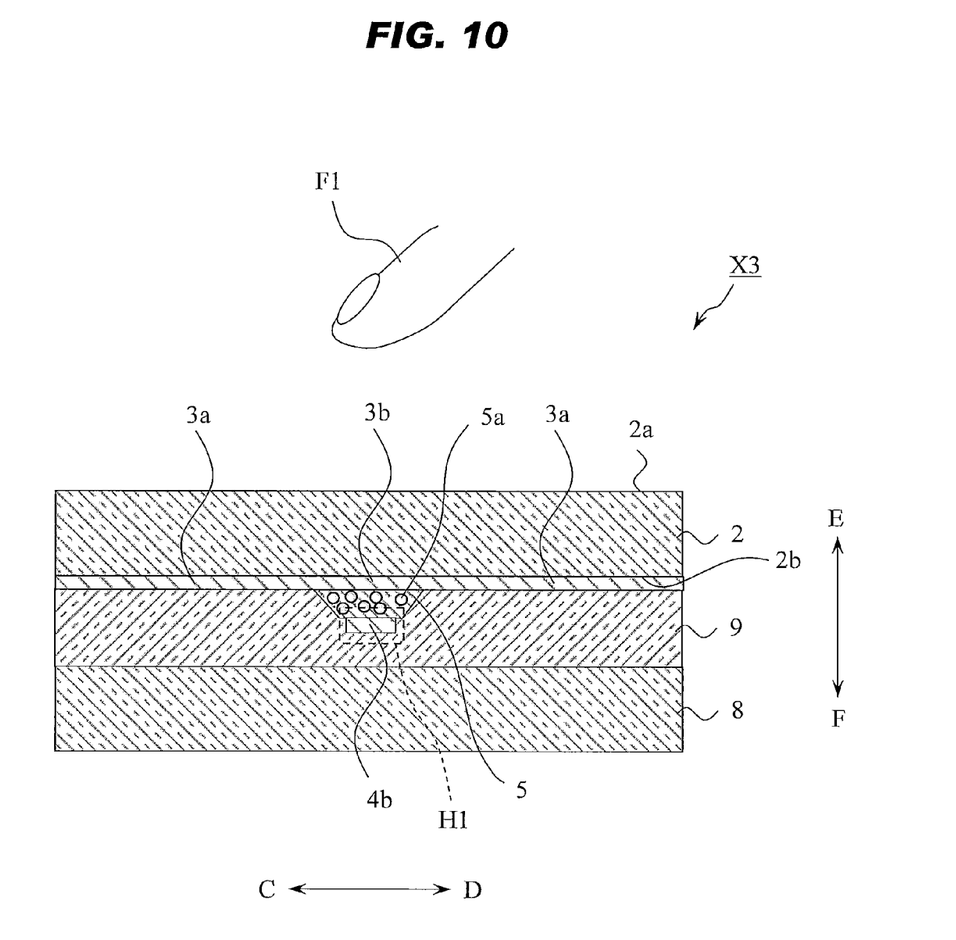
FIG. 10 is a cross-sectional view illustrating a general configuration of the input device according to the second modification. Note that FIG. 10 illustrates a cross section equivalent to that of FIG. 3.

FIG. 9 and FIG. 10 are cross-sectional views illustrating a general configuration of an input device X3 according to a second modification. FIG. 9 illustrates a cross section equivalent to that of FIG. 2, and FIG. 10 illustrates a cross section equivalent to that of FIG. 3. In FIG. 9 and FIG. 10, components having the same functions as those of the components illustrated in FIG. 2 and FIG. 3 are given the same reference numerals and their detailed description will be omitted.

As illustrated in FIG. 9 and FIG. 10, as in the case of the input device X1, the input device X3 of the second modification includes the insulator 5 disposed on the second principal surface 2b of the substrate 2 such that it covers the first connecting electrodes 3b. However, the input device X3 of the second modification is different from the input device X1 in that the insulator 5 not only electrically isolates the first connecting electrodes 3b from the second connecting electrodes 4b, but also serves as a light diffusing member. The insulator (light diffusing member) 5 contains a plurality of light diffusing particles 5a having a refractive index different from that of the insulator 5.

In the input device X3 of the second modification, the joining member 9 is disposed such that it covers the first detecting electrodes 3a, the first connecting electrode 3b, the second detecting electrodes 4a, the second connecting electrode 4b, the insulator 5, and the wiring conductors 6. The protecting member 8 is disposed on the joining member 9.

Even when the insulator 5 serves as a light diffusing member, the same effects as those described in the above embodiment can be achieved. In the input device X3 of the second modification, since the insulator 5 serves as a light diffusing member, an image blur can be suppressed even if the haze value of the insulator (light diffusing member) 5 is increased. This means that in the input device X3, the appearance of the intersection H1 can be more effectively improved.

Third Modification

Figure 11:
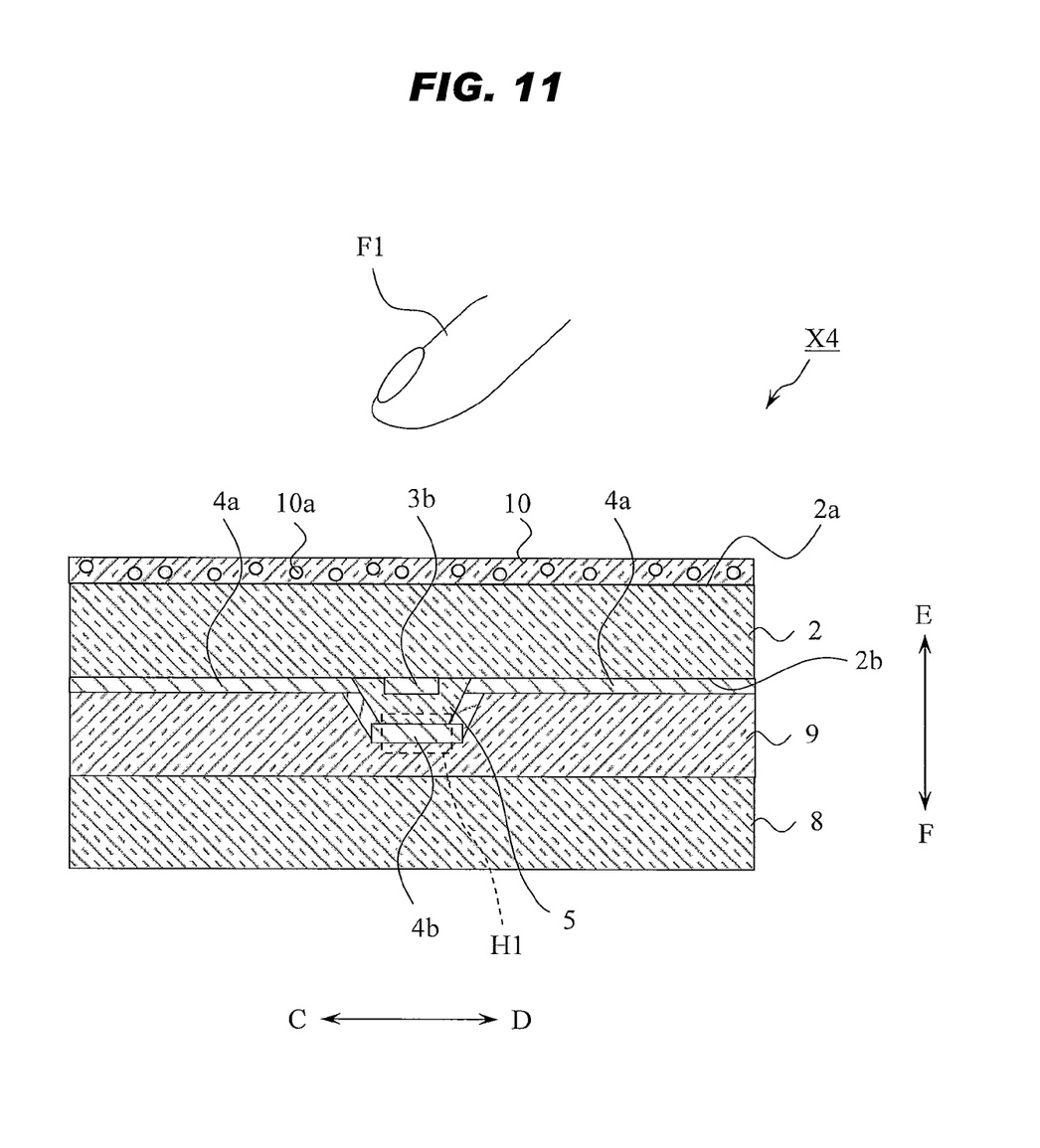
FIG. 11 is a cross-sectional view illustrating a general configuration of an input device according to a third modification. Note that FIG. 11 illustrates a cross section equivalent to that of FIG. 2.
Figure 12:
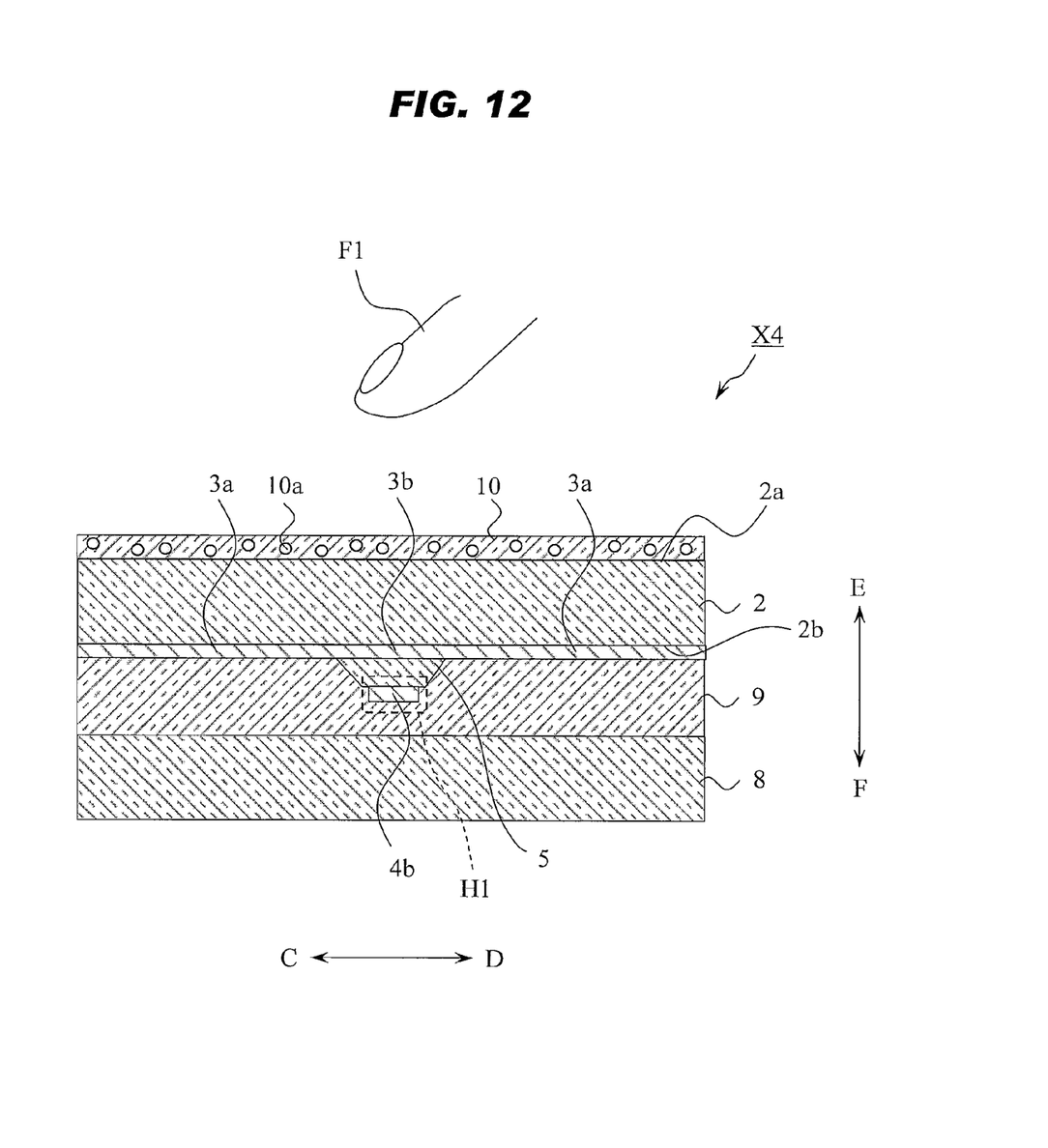
FIG. 12 is a cross-sectional view illustrating a general configuration of the input device according to the third modification. Note that FIG. 12 illustrates a cross section equivalent to that of FIG. 3.

FIG. 11 and FIG. 12 are cross-sectional views illustrating a general configuration of an input device X4 according to a third modification. FIG. 11 illustrates a cross section equivalent to that of FIG. 2, and FIG. 12 illustrates a cross section equivalent to that of FIG. 3. In FIG. 11 and FIG. 12, components having the same functions as those of the components illustrated in FIG. 2 and FIG. 3 are given the same reference numerals and their detailed description will be omitted.

As illustrated in FIG. 11 and FIG. 12, in the input device X4 of the third modification, a protecting member 10 is disposed on the first principal surface 2a of the substrate 2. The protecting member 10 is, for example, a PET film or a resin film. The protecting member 10 not only protects the first principal surface 2a of the substrate 2, but also serves as a light diffusing member. The protecting member (light diffusing member) 10 contains a plurality of light diffusing particles 10a having a refractive index different from that of the protecting member 10.

Even when the protecting member 10 serves as a light diffusing member, the same effects as those described in the above embodiment can be achieved.

Fourth Modification

In the input device X1 described above, a portion of the first principal surface 2a of the substrate 2, the portion corresponding to the input region $E_I$, is a surface which allows the user to input information by moving the finger F1 closer thereto, or by touching or pressing it with the finger F1. However, this is merely an example. That is, the back surface of the protecting member 8 may serve as a surface which allows the user to input information by moving the finger F1 closer thereto, or by touching or pressing it with the finger F1. In this case, the input device X1 and the liquid-crystal display device Z1 are bonded to each other such that the first principal surface 2a of the substrate 2 faces the principal surface of the liquid-crystal display panel 50.

Fifth Modification

In the description above, the display panel to which the input device X1 is bonded is a liquid-crystal display panel. However, the display panel is not limited to this. The display panel to which the input device X1 is bonded may be, for example, a cathode-ray tube (CRT), a plasma display, an organic electroluminescent (EL) display, an inorganic EL display, an LED display, a fluorescent display tube, a field emission display, or a surface-conduction electron-emitter display.

Sixth Modification

Although the display apparatus Y1 including the input device X1 has been described above, the input device X1 may be replaced by any of the input devices according to the first to fifth modifications.

What is claimed is:

1. An input device comprising:
   a substrate including a first principal surface and a second principal surface opposite the first principal surface;
   a plurality of first detecting electrodes disposed on the second principal surface of the substrate;
   a plurality of second detecting electrodes disposed on the second principal surface of the substrate;
   at least one first connecting electrode disposed on the second principal surface of the substrate, the first connecting electrode being configured to connect adjacent first detecting electrodes to each other;
   at least one second connecting electrode including an intersection that is spaced from the second principal surface of the substrate and crosses the first connecting electrode, the second connecting electrode being configured to connect adjacent second detecting electrodes to each other; and
   a light diffusing member disposed at least in an area corresponding to the intersection.

2. The input device according to claim 1, further comprising an insulator disposed on the second principal surface of the substrate such that the insulator covers the first connecting electrode,
  wherein the second connecting electrode is disposed on the insulator such that the second connecting electrode is electrically isolated from the first connecting electrode; and
  the light diffusing member is disposed such that the light diffusing member covers the intersection and the insulator.

3. The input device according to claim 1, wherein the light diffusing member is disposed on the second principal surface of the substrate such that the light diffusing member covers the first connecting electrode; and
  the second connecting electrode is disposed on the light diffusing member such that the second connecting electrode is electrically isolated from the first connecting electrode.

4. The input device according to claim 1, wherein the light diffusing member is disposed on the first principal surface of the substrate.

5. The input device according to claim 1, wherein a haze value of the light diffusing member is in the 0.5% to 2.0% range.

6. The input device according to claim 1, wherein the light diffusing member includes an adhesive member and a plurality of light diffusing particles contained in the adhesive member and having a refractive index different from that of the adhesive member.

7. A display apparatus comprising:
  the input device according to claim 1; and
  a display panel disposed opposite the input device.

8. The display apparatus according to claim 7, wherein the display panel is a liquid-crystal display panel.

* * * * *